FIG.1

A. E. & G. LAWTON.
MACHINE FOR MANUFACTURING TUBES.
APPLICATION FILED JUNE 3, 1912.

1,070,268.

Patented Aug. 12, 1913.
8 SHEETS—SHEET 7.

UNITED STATES PATENT OFFICE.

ALBERT EDWARD LAWTON, OF MANCHESTER, AND GEORGE LAWTON, OF SHEFFIELD, ENGLAND.

MACHINE FOR MANUFACTURING TUBES.

1,070,268.

Specification of Letters Patent.

Patented Aug. 12, 1913.

Application filed June 3, 1912. Serial No. 701,393.

*To all whom it may concern:*

Be it known that we, ALBERT EDWARD LAWTON and GEORGE LAWTON, subjects of the King of Great Britain, residing at 105 East road, Longsight, Manchester, England, and 30 Talbot Place, Park, Sheffield, England, respectively, have invented certain new and useful Improvements in Machines for Manufacturing Tubes; and we do hereby declare the following to be a full, clear, and exact description of the invention, such as will enable others skilled in the art to which it appertains to make and use the same.

This invention relates to improvements in apparatus for the manufacture of tubes from helically wound strips of metal.

According to the present invention two strips which are preferably previously heated to the temperature of the molten solder in the die box are led into the die box by feed rolls the bottom one of which is located within the die box. The strips are forced around against cylindrical rollers which lie parallel with the axis of the issuing tube. They then pass through the box of molten metal while in the die box as heretofore and as the strips come around upon themselves they are gripped a second time by the feed rolls so that the overlapping joints are nipped together a second time. The strips in the die box are forced in a helical course and kept in their relative position by means of shoulders on the antifriction rollers above referred to. The tube in issuing from the die box is supported by rollers which as heretofore are capable of adjustment so as to be capable of supporting tubes of different diameters. In this instance the rollers are arranged to be adjusted in a direction radially of the center of the tube. The cutting off device is mounted on a sliding carriage as heretofore and controlled by a trip device. It is however interconnected with the supporting rolls so that it is capable of adjustment in a direction radially of the center of the tube. At the same time it is actuated in an improved manner hereinafter described.

According to the present invention the machine with but slight alteration can be made for forming tubes from a single strip of special cross section, namely, a section which is rolled with two steps one on each side so that the outside edges of the strip are formed of half the thickness of the center portion of the strip and so proportioned that in coiling one edge comes underneath the other edge and forms a tube having a smooth surface both inside and out.

The only modifications which are necessary to enable a tube to be manufactured from the strip are in the means for guiding the same to the feed rolls.

In order that the invention may be fully understood reference will now be had to the accompanying drawings in which:—

Fig. 3 is a plan view of Fig. 1. Fig. 22 is a plan view of Fig. 21 with the bearings for the supporting rolls removed. Fig. 27 is an enlarged plan view in partial section of the saw trip gear shown in Fig. 3. Fig. 28 is an end view of the saw trip gear looking in the direction of the arrow XXVIII Fig. 27 while Fig. 29 is a cross section on the line XXIX—XXIX of Fig. 27 looking in the direction there indicated.

In order that the reference ciphers in the following description may be readily allotted to their respective parts the parts of the device performing the different functions are each given a letter index. The parts of the feeding in mechanism will be given the index $a$ and the mechanism as a whole indicated by A, the parts of the die box the index $b$ and the mechanism as a whole indicated by B, the parts of the tube supporting mechanism the index $c$ and the mechanism as a whole indicated by C, the parts of the trip gear the index $d$ and the mechanism as a whole indicated by D, the parts of the saw cutting device the index $e$ and the mechanism as a whole indicated by E.

Figure 1:
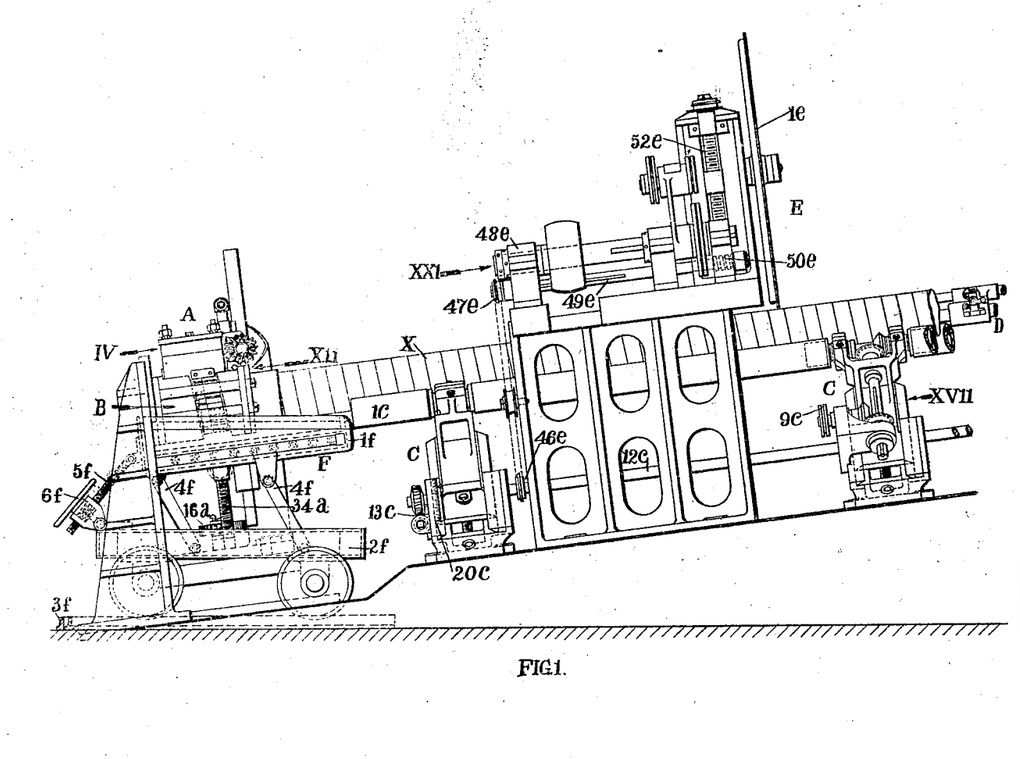
Figure 1 is a side elevation of the machine as a whole.
Figures 2, 3:
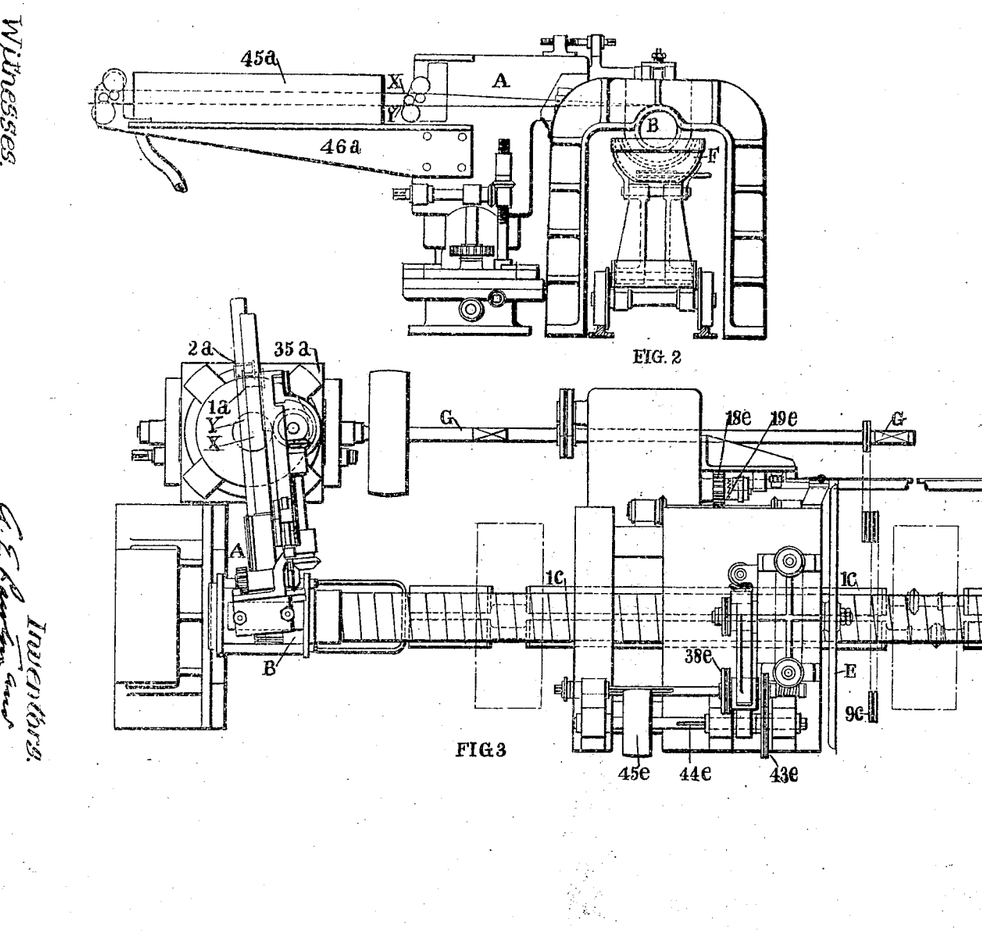
Figure 2:
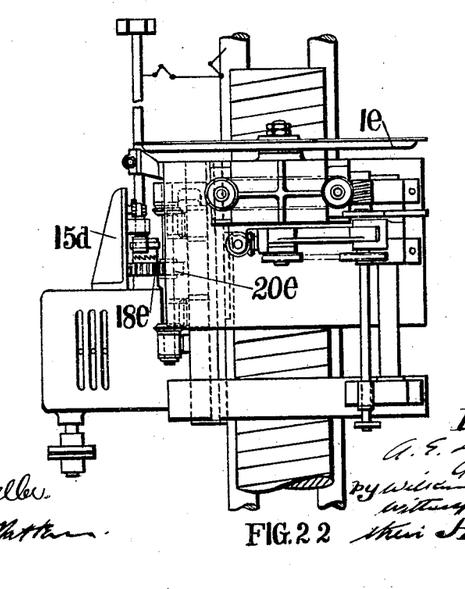
Fig. 2 an end elevation of the machine with the gear for raising and lowering the solder bath omitted.

As will be seen more especially in Figs. 1, 2 and 3 the device is provided with a feeding in device A which feeds two strips of material X and Y (or in certain cases only one strip) into the die box B in which they are formed into spirals and soldered together and forced out of the die box in the form of a tube on to the supporting device C along which the tube travels till it comes to a trip device D which causes the cutting off or saw device E to be operated. The solder bath and its parts are indicated as a whole by the letter F and are capable of being raised and lowered. The main driving shaft of the device is indicated by G as will be seen more especially in Fig. 3.

Figures 4, 5, 6, 7, 8:
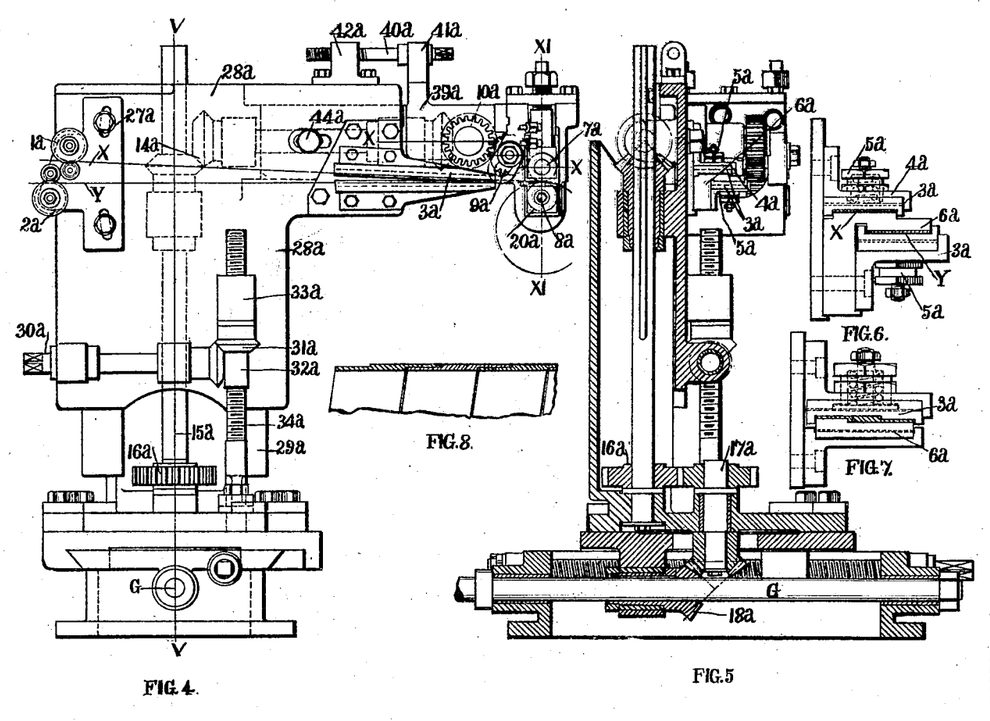
Fig. 4 is an enlarged end elevation showing the feed rolls and looking in the direction of the arrow IV Fig. 1.
Fig. 5 is a sectional elevation of the feed rolls taken on the line V—V of Fig. 4.
Fig. 6 is a detail view showing the means for guiding the strips to the force rolls on a large scale.
Fig. 7 is a similar view to Fig. 6 the parts being modified so as to be suitable for a single and specially constructed strip hereinafter described.
Fig. 8 is a sectional view showing a portion of a tube constructed with the single strip of special section.
Figures 9, 10, 11:
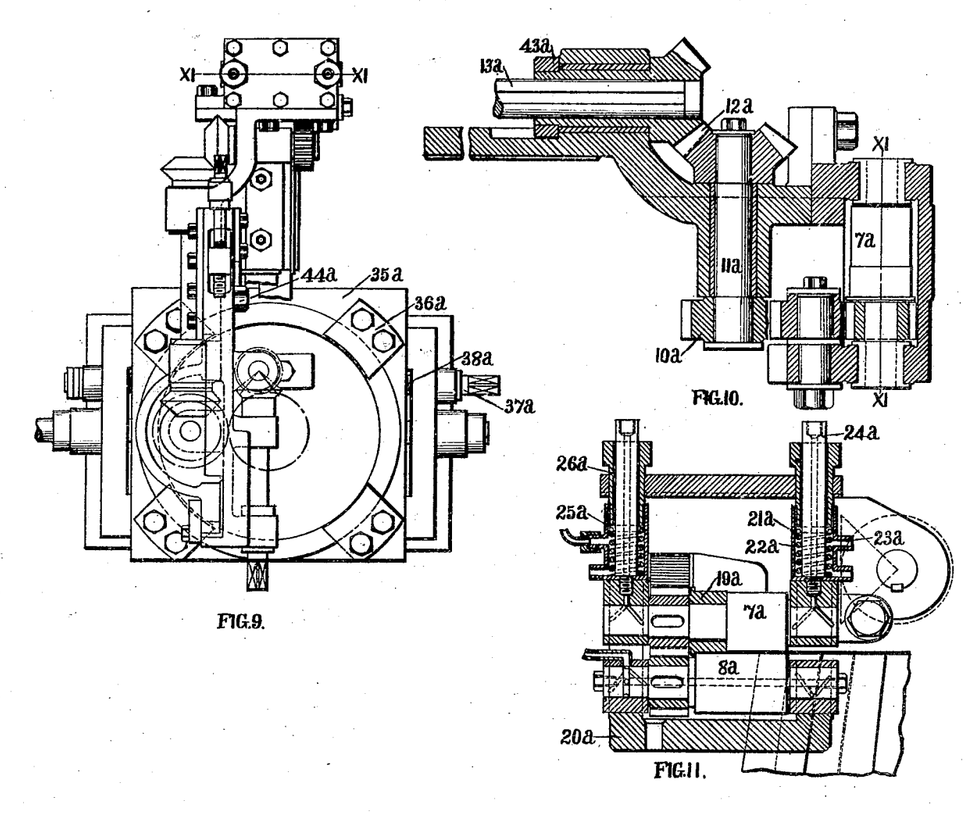
Fig. 9 is a plan view of the mechanism actuating the feed rolls shown in Fig. 4 with the guide pulleys removed.
Fig. 10 is a sectional plan view on the line X—X of Fig. 4 showing the method of operating the feed and pressing rolls.
Fig. 11 is a sectional end view of the feed and pressing rolls taken on the line XI—XI of Figs. 4, 9 and 10.
Figure 12:
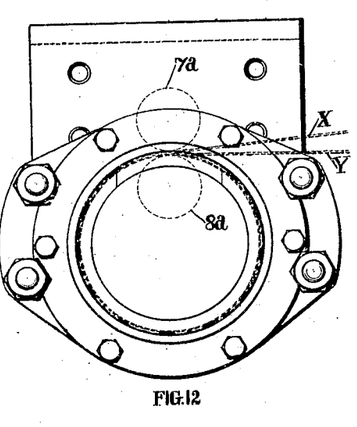
Fig. 12 is an end elevation of the die box showing the relative position of the feed rolls in dotted lines and looking in the direction of the arrow XII in Fig. 1.
Figure 13:
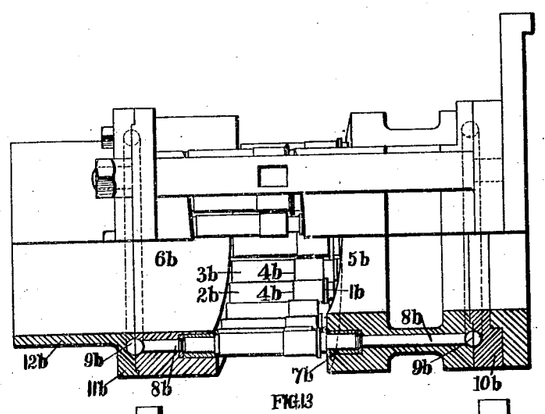
Fig. 13 is a half elevation and half section of the die box shown in Fig. 12.
Figure 14:
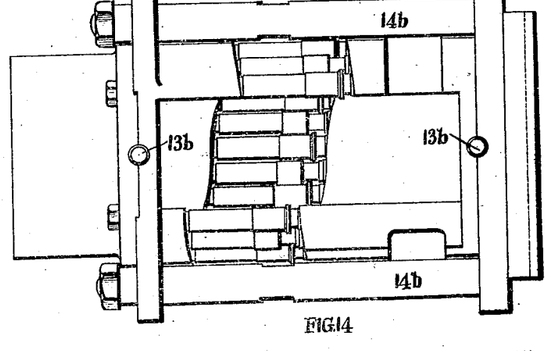
Fig. 14 is a plan view of the die box shown in Fig. 13 with the feed rolls removed.
Figures 15, 16:
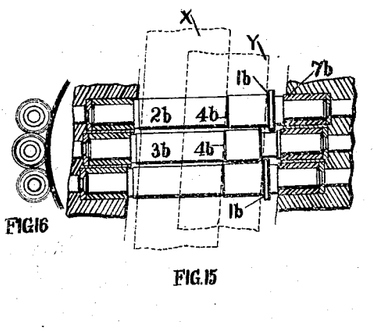
Fig. 15 is a detail view showing the force rolls in the die box and the method of mounting the same.
Fig. 16 is an end view of the detail view Fig. 15.

*Feeding in device.*—The feeding in device is best explained with reference to Figs. 4 to 11. In Fig. 4 it will be seen that the two strips X and Y first pass between guide rollers $1^a$ and $2^a$ and thence through pressure plates $3^a$ which are shown in end view in Fig. 5 and on an enlarged scale in Fig. 6. These pressure plates are secured to the frame of the machine by brackets $4^a$ to which they are held so as to be normally pressed the one toward the other by means of springs located in the housings $5^a$. Between the guide plates $3^a$ there is located a stationery plate $6^a$ which is rigidly secured to the frame of the machine. As will be seen in Figs. 5 and 6 the guide plates are formed with recesses into which portions of the stationary plate $6^a$ enter so as to form slideways for the two strips X and Y to pass along. It will be noted that the guide plates are so located that each of the strips overlaps the other strip for half of its width which is their relative position during and after the manufacture of the tubes. The pressure of the springs in the housings $5^a$ pressing the plates $3^a$ upon the plate $6^a$ causes any inequality or unevenness in the strips to be taken out before the same pass to the feed and pressing rolls $7^a$ and $8^a$ which are more clearly shown in Figs. 10 and 11. These rolls $7^a$ and $8^a$ are positively driven one from the other by gear wheels which are in turn driven by an intermediate toothed wheel $9^a$ which is driven by a toothed wheel $10^a$ mounted on a short shaft $11^a$ which is connected by bevel gearing $12^a$ to the rotating splined shaft $13^a$ which is again connected by bevel gearing $14^a$ and driven from a further spline shaft $15^a$ which in turn is connected by gearing $16^a$ with a central shaft $17^a$ driven by bevel gearing $18^a$ from the main driving shaft of the machine G. The upper feed roll $7^a$ as shown in Fig. 11 is provided with a sleeve $19^a$ of slightly greater diameter than the roll $7^a$ so as to form a shoulder against which the edge of the outer strip X can bear when passing between the two rolls. The sleeve $19^a$ is mounted loosely on the roll $7^a$ so as to compensate for the different peripheral speeds of the two parts. The bearings of both the feed rolls $7^a$ and $8^a$ shown in Fig. 11 are mounted in housings $20^a$. The bearings for the roll $7^a$ are normally pressed downward by spring pressure the springs $21^a$ being located in a closed cylinder $22^a$ through which it is possible to arrange for a circulation of water by pipes $23^a$ to prevent the springs from overheating as would be the case were no provision made for keeping them cool. The cylinders $22^a$ are provided with cores $24^a$ about which the springs $21^a$ are located and which serve at the same time as means for conducting lubricant to the bearings of the roll $7^a$. The spaces between the cores $24^a$ and the cylinders $22^a$ are filled in with leather packings $25^a$ held in position by housing screws $26^a$.

It will be noted that the rolls $7^a$ and $8^a$ are of such a length as to grip the strips and nip them together after they have come from the solder bath as will be hereinafter described. In Figs. 7 and 8 a special section of strip is shown whereby a tube can be formed from a single strip. Fig. 7 shows the necessary modification in the pressure plate $3^a$ one of which only is required in this case. Fig. 8 shows the section of the tube formed with the special section of strip. Previous to entering the guide rollers $1^a$ and $2^a$ the strips X and Y pass through a furnace $45^a$ Fig. 2 in which hot gases are brought to bear on the strips heating them to such a temperature that they will not cause the solder to be chilled upon immersion. This furnace is preferably mounted upon a bracket $46^a$ which in turn is bolted to the saddle $28^a$.

*The die box.*—The die box B shown in Fig. 1 and in greater detail in Figs. 12 to 16 is located so that the strips X and Y which are fed through by the feed rollers $7^a$ and $8^a$ are forced directly into it and owing to its shape and the arrangement of its rolls hereinafter described the strips are forced around in a helix upon themselves until they again approach the feeding in rolls where they are again nipped together so as to form a part of the issuing manufactured tube or cylinder. The strips in being forced around in the die box are given their helical course by the one strip coming in contact with flanges $1^b$ located on rollers $2^b$ which are alternated with rollers $3^b$, while the relative positions of the two strips are held by the outer strip bearing against shoulders $4^b$ formed upon both sets of rollers $2^b$ and $3^b$. As will be noted these rollers are arranged with their axes parallel with the axis of the issuing manufactured tube and except for the shoulders above described are of uniform thickness throughout their length. These rollers bear in angular rings $5^b$ and $6^b$ the facing surfaces of which are formed in a helix corresponding to the pitch of the helix in the finally manufactured tube. The rollers bear in the facing portions of these two rings $5^b$ and $6^b$ in bushes $7^b$ located in sockets. These sockets are provided at their inner ends with lubricating ducts $8^b$ which pass right through to the opposite faces of the two rings. On the faces of each of these rings there is formed a semi-circular groove $9^b$ which together with a similar groove on the adjacent plate $10^b$ and on the flange $11^b$ of the mouth $12^b$ of the die box forms a circular lubricating duct which on the top of the die box communicates with the outside by means of vertical ducts $13^b$. The two rings on the die box are held at the desired distance apart by means of spacing bars $14^b$.

It will be obvious from the foregoing description that both of the strips are guided in a helical direction by the special arrangement of rolls described and they are further during the whole of their travel through the die box kept in their relative positions and they pass through the die box with as little friction against their guiding surfaces as is possible.

As only the lower portion of the die box will be immersed in the molten solder a hood or casing of suitable construction is arranged so as to conduct the hot gases from the solder furnace to the upper portion of the die box. The heat so conducted may be augmented by jets of flame, the object being to maintain the whole of the die box at a constant temperature. The hood is not shown in the drawings, being omitted to allow the construction of the die box to be clearly illustrated.

Figure 17:
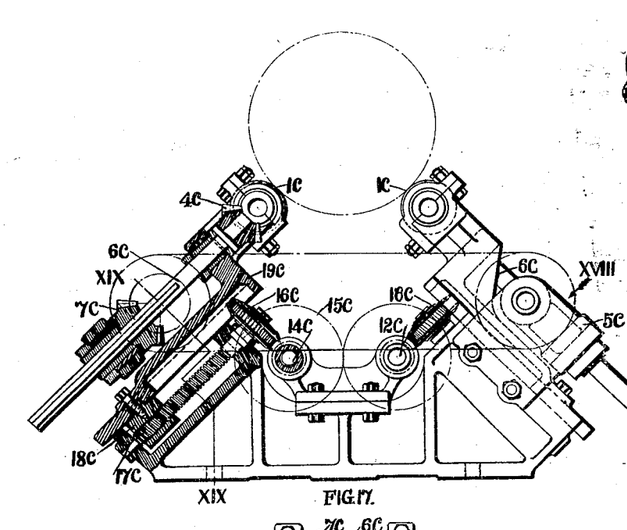
Fig. 17 is an elevation in partial section showing the method of mounting the supporting rolls looking in the direction of the arrow XVII Fig. 1.
Figure 18:
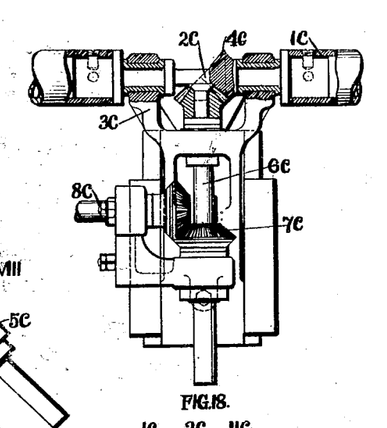
Fig. 18 is a side elevation in partial section of one supporting roll looking in the direction of the arrow XVIII Fig. 17.
Figure 19:
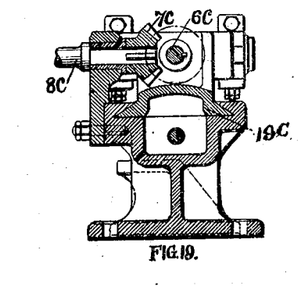
Fig. 19 is a section on the line XIX—XIX Fig. 17.
Figure 20:
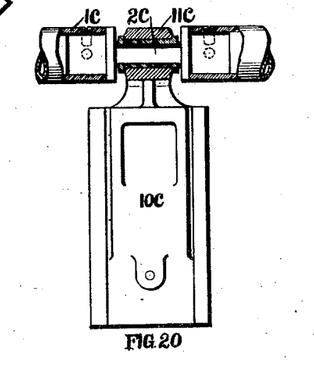
Fig. 20 is an elevation in partial section of one of the supporting bearings for the supporting rolls.

*The supporting mechanism.*—The manufactured tube as it issues from the die box B is supported by rotating rollers $1^c$ shown with their bearings and actuating mechanisms in Fig. 1 and on a larger scale in Figs. 17 to 20. The rollers $1^c$ are arranged in suitable lengths and connected by short shafts $2^c$ which bear in brackets $3^c$. At such parts of their length as it is desired to positively drive the rollers $1^c$ bevel gearing $4^c$ as shown in Figs. 17 and 18 is arranged. The bearings are mounted on inclined supports or standards $5^c$ which carry spline shafts $6^c$ connected to the bevel gearing $4^c$ above referred to. These spline shafts are themselves driven by bevel gearing $7^c$ which is in turn driven from a shaft $8^c$ actuated from a sprocket wheel $9^c$ Figs. 1 and 3, the sprocket wheel being actuated by suitable chain gearing as shown in Fig. 3 on the main shaft G. At such places as it is simply desired to support the rollers $1^c$ the arrangements shown in Fig. 20 are adopted whereby inclined supports $10^c$ are provided with simple bearings $11^c$ for the short shafts $2^c$ connecting up the different lengths of the rollers $1^c$.

Figure 21:
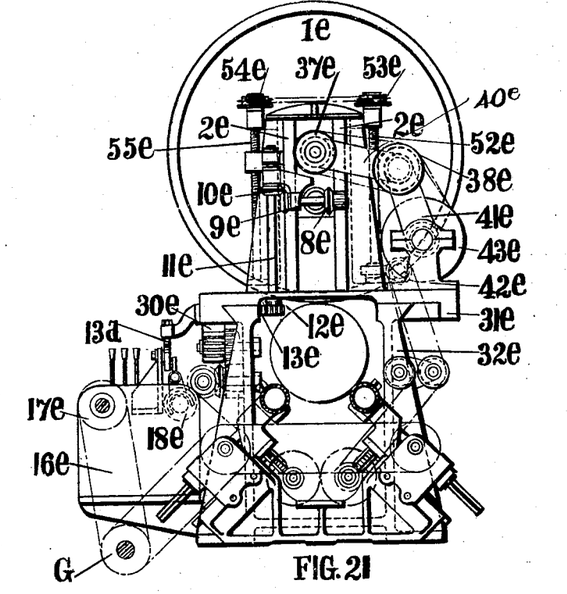
Fig. 21 is an end elevation of the saw operating mechanism looking in the direction of the arrow XXI Fig. 1.

*The saw cutting device.*—The saw $1^e$ which is shown in Figs. 1 and 3 and in greater detail in Figs. 21 to 26 is mounted between standards $2^e$ and bears in a block $3^e$ adjustable for purposes hereinafter described in the supports $2^e$ and in a further block $4^e$ which is capable of vertical movement in the block $3^e$. The block $4^e$ is provided with a stirrup $5^e$ which has two rods which project up through a portion of the block $3^e$ and are normally held in their highest position by means of suitable springs $6^e$ the springs $6^e$ tending therefore to normally hold the saw $1^e$ in its highest position. The stirrup $5^e$ carries a small roller $14^e$ while the block $3^e$ also carries a rotating cam $7^e$ shown on an enlarged scale in Fig. 25 which is rotated as shown in Fig. 21 by means of bevel gearing $8^e$, shaft $9^e$, bevel gearing $10^e$ and spline shaft $11^e$. The bevel wheel of the bevel gearing $10^e$ on the shaft $11^e$ is capable of sliding up and down on the shaft. The lower end of the spline shaft $11^e$ carries a pinion $12^e$ which works in a rack $13^e$ as the saw and its standard is reciprocated backward and forward as hereinafter described. It will be obvious that the outward reciprocation of the saw will cause the pinion $12^e$ to travel along the rack $13^e$ and rotate and finally cause the cam $7^e$ to also rotate in such a way as to force down the saw $1^e$ until the point of the cam passes the roller $14^e$ when the springs will again raise the saw. On the backward travel of the saw the cam $7^e$ will naturally tend to rotate in the reverse direction but will be incapable of doing so owing to the small roller $14^e$. To permit however of the shaft carrying the cam $7^e$ rotating the cam is mounted on a free wheel mechanism $15^e$. The reciprocation of the saw $1^e$ and its supports $2^e$ in a direction parallel to the axis of the manufactured tube is brought about by means of the device shown more particularly in Figs. 3, 21, 22 and 23. For this purpose a suitable differential gear $16^e$ (not shown in detail in the drawings) is provided driven from the main shaft G by suitable chain gear $17^e$. The ultimate wheel $18^e$ of the differential and chain gear is connected to the gear in such a way as to be thrown in and out of engagement therewith by means of a clutch $19^e$ operated in a manner hereinafter described. The wheel $18^e$ engages with a spur wheel $20^e$ carried on a shaft $21^e$ carrying two bevel wheels $22^e$ and $23^e$ which drive bevel wheels connected to spur wheels $24^e$ and $25^e$. These latter spur wheels in turn drive shafts $26^e$ and $27^e$ which carry spur wheels $28^e$ and $29^e$ having teeth for only half of their periphery. These half wheels $28^e$ and $29^e$ work in connection with a rack $30^e$ which is rigidly connected to a saddle $31^e$ which slides upon a gauntree $32^e$. The mechanism shown in Fig. 23 causes a continuous reciprocation of the rack $30^e$ and therefore of the saw in a direction parallel with the axis of the tube in the following manner. In the position shown a stud $33^e$ on the half spur wheel $29^e$ is pressing against a downward projection $34^e$ on the rack so as to bring the teeth of the wheel $29^e$ into gear with the teeth of the rack so as to force the rack over to the right. After the wheel $29^e$ has made a half revolution it will of course not be able to forward the rack any further. At this point however the stud $35^e$ on the half spur wheel $28^e$ will be just coming into contact with the corresponding projection $36^e$ in the rack and so as the half spur wheel $28^e$ is rotated in the opposite direction to the half spur wheel $29^e$ it will force the rack back again to the left.

Figures 23, 24, 25, 26, 30:
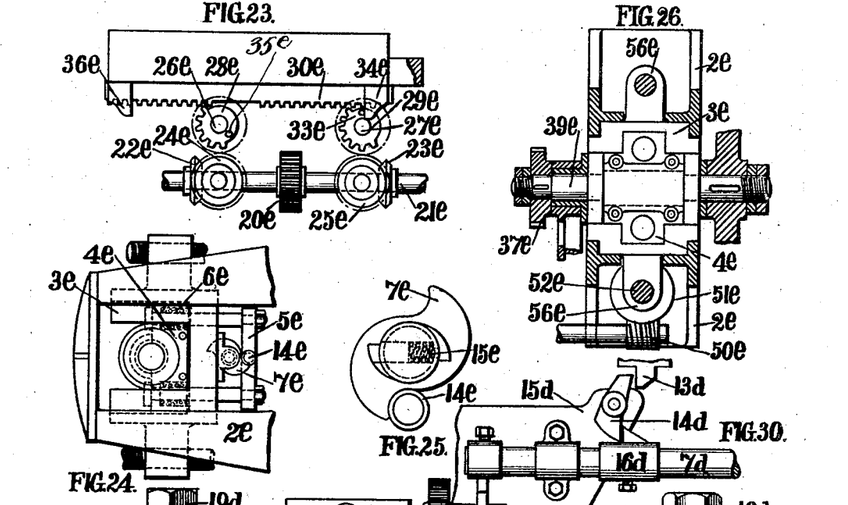
Fig. 23 is a detail view of the traversing mechanism of the saw.
Fig. 24 is a detail view showing the means for raising and lowering the saw.
Fig. 25 is a detail of the cam shown in Fig. 24.
Fig. 26 is a detail view showing the means for mounting the saw.
Fig. 30 is a detail view of the resetting motion for the saw trip gear.

The saw $1^e$ is connected rigidly to a sprocket wheel $37^e$ which in turn is driven by a chain from a sprocket wheel $38^e$. The shaft $39^e$ which carries the saw and sprocket $37^e$ is connected by a swinging arm $40^e$ to a further swinging arm $41^e$ while the sprocket $38^e$ bears upon a shaft which joins together and acts as a hinge for these two swinging arms $40^e$ and $41^e$. The other end of the arm $41^e$ is hinged to a standard $42^e$ on the saddle $31^e$ above referred to. The sprocket wheel $38^e$ is in its turn driven from the sprocket wheel $43^e$. The sprocket wheel $43^e$ is carried on a spline shaft $44^e$ and is capable of moving inward thereon with the saddle $31^e$, being held securely on the saddle between suitable side bearings. The spline shaft $44^e$ is driven independently of the rest of the device from a pulley $45^e$. The clutch $19^e$ is operated from the trip mechanism D.

Figures 27, 28, 29:
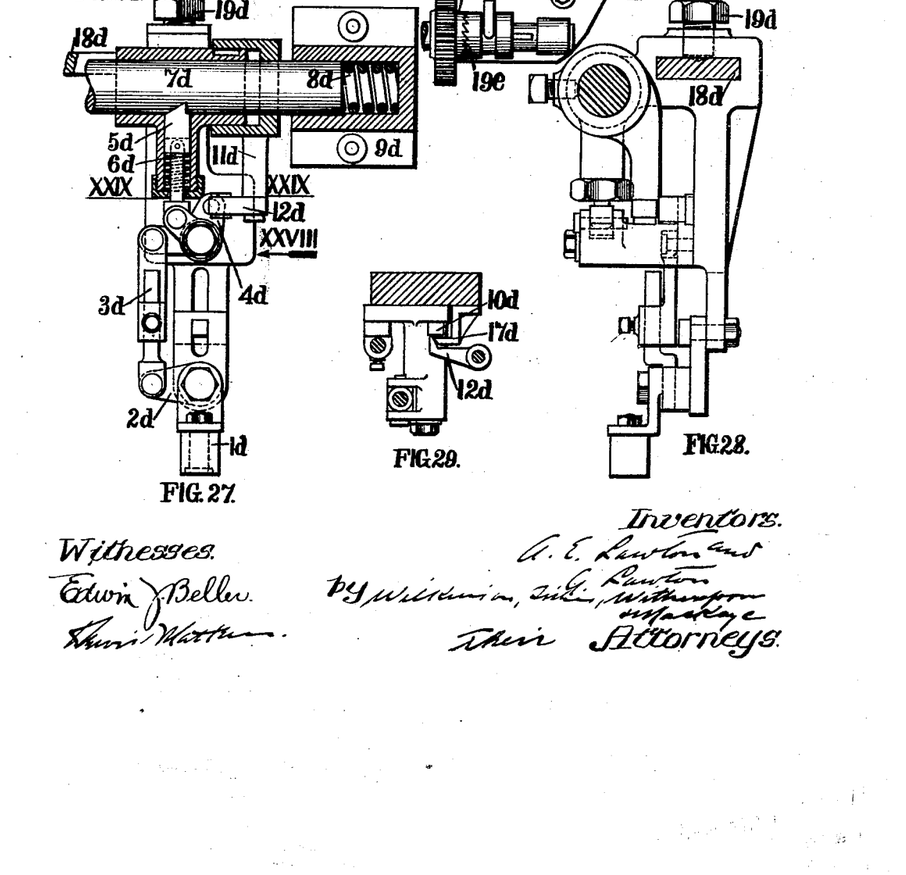

*Trip mechanism.*—The trip mechanism Figs. 27–29 consists of a finger $1^d$ which lies in the path of the finished tube as it issues from the device and is arranged at such a distance from the saw as to be operated only when the desired length of tube has traveled past the saw. As this is effected the tube comes into contact with the finger $1^d$ which is connected to a bell crank lever $2^d$ which pulls down a rod $3^d$ and turns a three armed lever $4^d$. The center arm of which draws down a catch $5^d$ against the pressure of the spring $6^d$. The drawing down of the catch $5^d$ releases the rod $7^d$ and permits the spring $8^d$ located in the housing $9^d$ to force the rod $7^d$ along to the left and so engage the clutch $19^e$ and set into train all the gearing for moving the saw along the axis of the tube and the mechanism for lowering the saw on to the tube as hereinbefore described. As it is desirable to keep the finger $1^d$ positively out of contact with the tube while the same is being cut, the third arm of the lever $4^d$ carries a small projection $10^d$ while the shaft $7^d$ carries a pawl bracket $11^d$ carrying a small pawl $12^d$ which normally rests upon the projection $10^d$. As the finger $1^d$ is forced aside by the tube the pawl $12^d$ falls behind the projection $10^d$ and then as the rod is given its sudden impulse to the left the pawl bracket $11^d$ and therefore the pawl $12^d$ is carried with the rod and the pawl $12^d$ forces the projection $10^d$ over to the left which will obviously hold the finger $1^d$ clear of the tube. The saw saddle or carriage $31^e$ is provided with a projection having a depending finger $13^d$ as in Fig. 30 which in the outward travel of the saddle passes a trip lever $14^d$ mounted on the bracket $15^d$. The lower end of this trip lever $14^d$ engages with a tooth $16^d$ arranged on the clutch rod $7^d$ and the finger $13^d$ on the outward travel of the saddle simply trips the lever $14^d$ but toward the end of its return travel will strike this lever $14^d$ and cause it to engage with the tooth 16$^d$ and so forces back the rod 7$^d$ against the pressure of the spring 8$^d$ in Fig. 7 and will at the same time draw back the pawl 12$^d$ so that it will rest upon the projection 17$^d$ and be raised clear of the projection 10$^d$ on the third arm of the lever 4$^d$ and so permit the finger to re-set itself and the catch 5$^d$ to again engage with the shaft 7$^d$.

*Solder bath.*—The solder bath F is arranged so as to be wholly removable from the die box B. For this purpose the actual bath is mounted on a trolley 2$^f$ bearing on suitable rails 3$^f$. The bath 1$^f$ is connected to the trolley by means of swinging supporting arms 4$^f$ and held in its adjusted position by means of a swinging threaded shaft 5$^f$ operated by any suitable mechanism 6$^f$ secured to the trolley. By operating the mechanism 6$^f$ the bath will swing down toward the trolley till it is clear of the die box after which the trolley can be removed on the rails 3$^f$.

The action of the device as a whole is as follows:—The two strips X and Y are led in past the guide rollers 1$^a$ and 2$^a$ through the pressure plates 3$^a$ to the feed rollers 7$^a$ and 8$^a$. By these feed rollers they are forced into the die box which owing to the arrangement of the rollers 2$^b$ and 3$^b$ and their shoulders 1$^b$ and 4$^b$ causes the two strips while keeping in their proper relative relation, with each of them overlapping the other for half of their width, to curve around upon themselves in a helix and in so doing to pass through the bath F of molten solder the two strips after passing through the bath again entering between the feed rollers 7$^a$ and 8$^a$ as shown in Fig. 11 where they are again nipped together as the solder is cooling and firmly secured to each other. The tube as it is formed keeps turning and issues out of the die box and comes on to the rollers 1$^c$ which help it to rotate. When the desired length of tube has been manufactured the trip device D is actuated so that the motion for traversing the saw is brought into action. As the saw is traversed the motion for depressing the saw is brought into action so that the saw which is rotated from a separate source comes down upon the tube and travels along with it until it has cut through the tube after which the saw is raised and forced back. The saddle carrying the saw in traveling back re-sets the trip device D so that the saw will again be put into motion on a further length of tube being manufactured.

The feed rolls and the bearing rollers together with the different gears for traveling the saw are all actuated in the manner as above described from the shaft G.

In order that the apparatus may be adapted for manufacturing tubes of different diameters and from strips of different widths a series of adjustments are necessary. These adjustments are as follows: For strips of different widths the guide pulleys 1$^a$ and 2$^a$ are interchanged for others of the necessary width. As will be seen in Fig. 4 these guide pulleys are mounted upon a plate 27$^a$ so that they together with the plate can easily and quickly be removed and other guide pulleys and plates substituted therefor. The guide plates 3$^a$ and the intermediate plate 6$^a$ can also be removed and others substituted therefor while the feed rolls 7$^a$ and 8$^a$ can also be removed with their housing 20$^a$. At the same time different sized die boxes can be used in the machine for accommodating the different widths of strip. The adjustments necessary for manufacturing tubes of different diameters are however of a more serious character necessitating in the first place the provision of a die box of the correct diameter, in the second place means for adjusting the feed rolls in height and in the relative angle between them and the axis of the tube, in the third place an adjustment for the height of the supporting rollers, in the fourth place an adjustment for the height of the saw and in the fifth place an adjustment for the rate of traverse of the saw while in addition there are means for adjusting the lengths of manufactured tube which are automatically cut off. It will be understood that the virtual axis or center of the manufactured tube remains constant for all dimensions of the manufactured tube.

*Adjustment for height of feed rollers.*— This adjustment is effected by mounting the guide pulleys or rollers 1$^a$ and 2$^a$ and the mechanism leading up to the feed rollers 7$^a$ and 8$^a$ on a vertically moving saddle 28$^a$ which slides upon a standard 29$^a$ being actuated by means of a suitable key applied to a shaft 30$^a$ which through bevel gearing 31$^a$ actuates a traveling nut 32$^a$ which bears in a thrust block in the lug 33$^a$ secured to the saddle 28$^a$. The vertical screwed shaft 34$^a$ about which the nut 32$^a$ rotates is fixed to the main foundation of the machine.

*Adjustment for the relative angle between the feed rollers and axis of tube.*—This adjustment is brought about by mounting the support 29$^a$ for the saddle carrying the feed rollers, etc., on a turn table 35$^a$ Figs. 9 and 3 the circular portion of which is held to the rigid portion by means of clamping devices 36$^a$ which can be slackened to allow of the whole device being turned around upon the bed. This adjustment will naturally remove the feed rollers from their proper relative position in the die box and to compensate for this it is necessary to provide for an adjustment of the device firstly lengthwise of the machine which is effected by turning the shaft 37ª which is screw threaded as shown at 38ª and engages underneath the platform or turn table 35ª, and secondly by adjustment of the feed rollers in a direction at right angles to their own axis. This latter adjustment is effected as shown in Figs. 9 and 4 by mounting the bevel gearing 12ª and the train of gearing leading up to the feed rollers 7ª and 8ª and these feed rollers themselves on a plate 39ª which is capable of sliding in the desired direction in slides on the saddle 28ª. This is effected by turning the shaft 40ª which bears in a lug 41ª secured to the sliding portion and engages with its screw threaded portion with an internally threaded lug 42ª mounted on the saddle 28ª. To permit of the bevel wheels 12ª keeping in gear through this last adjustment the shaft 13ª Fig. 10 is splined and the respective bevel wheel is mounted thereon so as to be capable of longitudinal movement, being held securely to the sliding portion 39ª by means of an external bearing 43ª shown in Fig. 10. The sliding portion 39ª is locked to the saddle 28ª by means of a suitable bolt 44ª Figs. 4 and 9.

*Adjustment for height of supporting rollers.*—This is best illustrated with reference to Figs. 1, 17 and 18. As shown in Fig. 1 the shaft 12ᶜ is actuated by hand through worm gearing 13ᶜ. This shaft is clearly shown in Fig. 17 and rotates a counter shaft 14ᶜ through spur gearing 15ᶜ. These two shafts 14ᶜ and 12ᶜ and each of the supports for the supporting rollers are provided with worm gearing 16ᶜ which drives stationary threaded shafts 17ᶜ. On each shaft 17ᶜ there is a nut 18ᶜ which is connected with a slide 19ᶜ which carries the bevel gearing 4ᶜ which is driven by the spline shaft 6ᶜ. As before described the spline shaft 6ᶜ is driven by means of the bevel gearing 7ᶜ. It will be obvious that as the worm gearing 13ᶜ is actuated the slide 19ᶜ will be moved up or down in a direction radially of the tube to be manufactured. At the same time owing to the arrangement of the spline shaft 6ᶜ and the bevel gearing 7ᶜ the rotation of the supporting rollers will not be affected.

*Adjustment of the saw.*—This adjustment is effected from the shaft 12ᶜ by means of a sprocket wheel 46ᶜ Fig. 1 which by means of suitable chains drives a sprocket wheel 47ᶜ securely held to the standard 48ᶜ and rotating the spline shaft 49ᶜ, at the outer end of which there is arranged a worm 50ᶜ shown in Figs. 1 and 26. This worm engages with a worm wheel 51ᶜ keyed to an upright threaded shaft 52ᶜ which carries at its upper end a sprocket wheel 53ᶜ which is connected by means of chain gearing with the sprocket wheel 54ᶜ on a further threaded shaft 55ᶜ on the opposite side of the saw actuating gear. The block 3ᶜ which carries the block 4ᶜ above referred to is provided at each side with a lug 56ᶜ each of which engages one of the upright threaded shafts 55ᶜ and 52ᶜ. It will therefore be obvious that when the worm gear 13ᶜ is operated to adjust the supporting rollers 1ᶜ the upright threaded shafts 52ᶜ and 55ᶜ will be operated so as to raise and lower the saw 1ᶜ in a direction radially of the tube being manufactured. As the sprocket wheel 47ᶜ is only connected to the shaft 49ᶜ by means of a spline it is possible for the shaft 49ᶜ to project out to the left in Fig. 1 as the saw is traversed. One of the standards carrying the supporting rollers 1ᶜ is, as is shown in Fig. 1, provided with a scale 20ᶜ whereby the necessary amount of adjustment of the supporting rollers and of the saw for specially sized tubes can be ascertained.

*Adjustment for the length of tube to be cut off.*—This adjustment is effected by mounting the trip device D on the square rod 18ᵈ and clamping it in position by means of a set screw or the like 19ᵈ so that its position along the rod 18ᵈ can be adjusted according to the length of tube to be cut off.

We declare that what we claim is:—

1. In an apparatus for manufacturing tubes from strips of metal, the combination of a die box; means for guiding the strips to said die box; spirally arranged roller dies in said die box collectively co-operable for coiling and supporting said strips in the form of a helix; means for uniting the said strips; and means for rotating the tube as finished.

2. In an apparatus for manufacturing tubes from strips of metal, the combination of a die box; means for guiding the strips to said die box; roller dies in said die box arranged with their axes parallel to the axis of the manufactured tube for the purpose of coiling said strip into a helix, said roller dies constructed with means for positioning the coils of the helix the required distance apart; pressing rollers for uniting the separate coils together; and means for turning the tube as finished.

3. In an apparatus for manufacturing tubes from strips of metal, the combination of a die box; means for guiding the strips to the said die box; roller dies in said die box arranged with their axes parallel to the axis of the tube, said roller dies constructed with shoulders for positioning the coils the requisite distance apart; pressing rollers for uniting the separate turns of the helix together; and means for turning the tube as it is formed.

4. In an apparatus for manufacturing tubes from metal strips, the combination of a die box; means for guiding the strips to said die box; roller dies in said die box with their axes parallel to the axis of the tube, said roller dies constructed with shoulders for positioning the coils the requisite distance apart; a bath of molten metal; pressing rollers for guiding said helix through said bath and uniting the separate turns of the helix together; and means for turning the tube as it is finished.

5. In an apparatus for manufacturing tubes from strips of metal, the combination of a die box; means for guiding the strips to said die box; roller dies in said die box with their axes parallel to the axis of the tube, said roller dies constructed with shoulders for positioning the coils the requisite distance apart; a bath of molten metal; pressing rollers for guiding said helix through said bath and uniting the separate turns of the helix together; means for turning the tube as it is finished; and means for cutting off predetermined lengths from the finished tube.

6. In an apparatus for manufacturing tubes from strips of metal, the combination of rollers for guiding the strips to a die box; roller dies in said die box for coiling said strips in the form of a helix; pressing rollers for guiding said helix through a bath of molten metal and uniting the separate turns of the helix together; means for rotating the tube as finished; and means for cutting off predetermined lengths from the finished tube.

7. In an apparatus for manufacturing tubes from strips of metal, the combination of a die box; an upper pressing and guiding roller; a lower pressing and guiding roller within said die box; roller dies in said die box arranged with their axes parallel to the axis of the tube, said roller dies constructed with shoulders for positioning the coils the requisite distance apart, said pressing rollers adapted for uniting the separate parts of the helix together; and means for turning the tube as it is formed.

8. In an apparatus for manufacturing tubes from strips of metal, the combination of a die box; an upper pressing and guiding roller; a lower pressing and guiding roller within said die box; roller dies for coiling said strips in the form of a helix, said roller dies having shoulders for positioning the coils of the said helix at the required distance apart, said pressing and guiding rollers adapted for passing said helix through a bath of molten metal; means for turning the tube as formed; and means for cutting off predetermined lengths from the finished tube.

9. In an apparatus for manufacturing tubes from strips of metal, the combination of means for feeding the strips; a die box formed of two annular sections having parallel helical faces; spacing bars holding said sections apart; and roller dies having parallel sides bearing in said helical faces, and adapted to shape the tube.

10. In an apparatus for manufacturing tubes from strips of metal, the combination of a die box formed of two annular sections having helical faces; an upper guiding and pressing roller; a lower guiding and pressing roller within said box; spacing bars holding said annular sections apart; and roller dies having parallel sides bearing in said annular sections, said pressing rollers adapted for uniting the contacting parts of the strip to shape the tube.

11. In an apparatus for manufacturing tubes from strips of metal, the combination of a die box formed of two annular sections having helical faces; an upper guiding and pressing roller; a lower guiding and pressing roller within said box; spacing bars holding said annular sections apart; roller dies having parallel sides bearing in said annular sections, and having shoulders for guiding the strips into the form of a helix; and means for turning the tube as it is finished.

12. In an apparatus for manufacturing tubes from strips of metal, the combination of a die box formed of two annular sections having helical faces; an upper guiding and pressing roller; a lower guiding and pressing roller within said box; spacing bars holding said annular sections apart; roller dies having parallel sides bearing in said annular sections, and having shoulders for guiding the strip into the form of a helix; a bath of molten metal through which the forming tube is immersed; means for turning the tube; and means for cutting off predetermined lengths from the finished tube.

13. In an apparatus for manufacturing tubes from strips of metal, the combination of a plain roller; a second roller having an enlargement acting conjunctively with said first roller; a die box formed of two annular sections having parallel helical faces; spacing bars holding said annular sections apart; and roller dies having parallel sides bearing in said helical faces, and having shoulders for shaping the tube.

14. In an apparatus for manufacturing tubes from strips of metal, the combination of a plain guiding and pressing roller; a second guiding and pressing roller having a relatively rotatable sleeve; a die box formed of two annular sections having helical faces; spacing bars holding said sections apart; and roller dies having parallel sides bearing in said helical faces and having shoulders and flanges whereby the strips are engaged at their overlapping and edge portions when passing through the die box; said first-named pair of rollers adapted for guiding said strips in o a molten bath of solder, and for pressing the soldered edges thereof to form a continuous tube while said molten metal is solidifying.

15. In an apparatus for manufacturing tubes from strips of metal, the combination of a plain guiding and pressing roller; a second guiding and pressing roller having a relatively rotatable sleeve; a die box formed of two annular sections having helical faces; spacing bars holding said sections apart; an annular series of roller dies having parallel sides bearing in said helical faces and having shoulders and flanges whereby the strips are engaged at their overlapping and edge portions and formed into a tube in said die box; means for holding a bath of molten metal for immersing the tube as it is formed to unite the coils thereof, said first-named rollers adapted for pressing the coils of said tube while said molten metal is solidifying; and means for cutting off predetermined lengths from the finished tube.

16. In an apparatus for manufacturing tubes from strips of metal, the combination of a die box; means for guiding the strips to said die box; a plurality of spirally arranged roller dies in said box collectively coöperable for coiling and supporting said strips in the form of a helix; and presser rollers for uniting the coils of said strips.

17. In an apparatus for manufacturing tubes from metal strips, the combination of a die box; means for feeding the strips to the said die box; roller dies in said die box with their axes parallel to the axis of the tube and having shoulders for positioning the tube coils the requisite distance apart; a bath of molten metal for soldering the tube coils; and means for turning the tube as it is finished.

18. In an apparatus for manufacturing tubes from strips of metal, the combination of a central guide plate; upper and lower guide plates coöperable with said central plate to guide two separate strips in correct relation; a die box; roller dies in said die box having shoulders adapted to coil said strips into the form of a helix; means for treating said helix to a bath of molten metal; and means for pressing said helix while said molten metal is solidifying.

19. In an apparatus for manufacturing tubes from a metal strip, the combination of strip guiding plates; a die box; roller dies in said die box and having shoulders adapted to guide the separate coils of the strip in relatively correct relation to form the tube; a bath of molten metal; means for compressing the tube while the molten metal is solidifying; means for cutting off predetermined lengths of the finished tube; means for moving said cutting off mechanism along the tube at the same speed as the tube is manufactured; means for releasing said cutting device; and means for returning said cutting device to its original position.

20. A strip feeding and guiding mechanism for tube forming machines comprising coöperating rollers; a stationary plate having oppositely projecting and relatively offsetting portions; movable plates having recesses engaging respectively with the offsetting portions of the stationary plate; and means for holding said movable plates under variable tension.

21. The combination in a tube forming machine of a die box comprising a pair of annular sections having opposed spiral walls; socket pieces located within said walls; and roller dies journaled within said socket pieces.

22. The combination in a tube forming machine of a die box; means for holding a bath of molten solder to immerse a portion of the die box; rollers journaled adjacent the die box and adapted to guide the strip and unite the soldered edges thereof; and means for cooling the journals of said guiding and pressure rollers.

23. The combination with a tube forming machine in which the finished tube is caused to travel axially thereof, of a tube severing mechanism comprising a saw and a carriage mounted to travel lengthwise of the tube; a toothed rack carried by said carriage; a pair of segmental pinions operable to alternately engage with said rack to reciprocate the carriage; means for constantly rotating said segmental pinions; and means for causing the saw to engage with the tube while the carriage is traveling in one direction, and to hold said saw out of said engagement during the travel of the carriage in the opposite direction.

24. The combination with a tube forming machine in which the finished tube travels axially thereof, severing means therefor mounted on a reciprocating carriage, and means for reciprocating the carriage and operating the severing means, of means for controlling the carriage movements comprising a clutch associated with the carriage operating means; a trip adapted to be engaged and actuated by the formed tube; and connections between said clutch and the trip operable to throw the clutch into and out of engagement.

25. The combination with a tube forming machine in which the finished tube travels axially thereof, severing means therefor mounted on a reciprocating carriage, and means for reciprocating the carriage and operating the severing means, of means for controlling the reciprocations of the carriage and the tube severing mechanism comprising a clutch associated with the carriage operating mechanism; a shaft on which said clutch is mounted; a device for holding said shaft to disconnect the clutch; a spring tensioned against said shaft and operable to move the same to connect the clutch; a trip associated with said shaft holding device adapted to be engaged and released by the formed tube; a trip lever adapted to shift the shaft to disconnect the clutch; and a device carried by the carriage for operating said trip lever.

In testimony whereof, we affix our signatures, in presence of two witnesses.

ALBERT EDWARD LAWTON.
GEORGE LAWTON.

Witnesses:
VICTOR ARMSTRONG,
CHARLES HEBBERT.